United States Patent
Melvin

(10) Patent No.: US 6,922,138 B2
(45) Date of Patent: Jul. 26, 2005

(54) VEHICLE SPECIFIC MESSAGING APPARATUS AND METHOD

(76) Inventor: Stephen Waller Melvin, 967 14th St., San Francisco, CA (US) 94114-1220

( * ) Notice: Subject to any disclaimer, the term of this patent is extended or adjusted under 35 U.S.C. 154(b) by 37 days.

(21) Appl. No.: 10/249,904

(22) Filed: May 16, 2003

(65) Prior Publication Data

US 2003/0233275 A1 Dec. 18, 2003

Related U.S. Application Data

(60) Provisional application No. 60/319,251, filed on May 16, 2002.

(51) Int. Cl.[7] .............................. G08B 3/00; G08B 5/00; G08B 7/00; G08B 1/123; G01C 22/00; G01D 1/00; G08G 1/00
(52) U.S. Cl. ................... 340/438; 340/691.6; 340/928; 340/988; 701/1; 701/22; 701/24
(58) Field of Search .............................. 340/438, 691.6, 340/928, 988; 701/1, 22–24

(56) References Cited

U.S. PATENT DOCUMENTS

| | | | | |
|---|---|---|---|---|
| 6,060,993 A | * | 5/2000 | Cohen | 340/691.6 |
| 6,587,755 B1 | * | 7/2003 | Smith et al. | 701/1 |
| 6,690,286 B2 | * | 2/2004 | Polyakov | 340/691.6 |
| 2002/0097193 A1 | * | 7/2002 | Powers | |

* cited by examiner

Primary Examiner—Jeffery Hofsass
Assistant Examiner—Lam Pham
(74) Attorney, Agent, or Firm—Stephen W. Melvin

(57) ABSTRACT

A system for providing directed advertising or informational messages specific to individual persons or vehicles. The system encompasses a sensing and evaluation mechanism to detect persons or vehicles, in conjunction with a billboard or other display device capable of delivering a message specific to one or more individuals.

13 Claims, 3 Drawing Sheets

VEHICLE SPECIFIC MESSAGING APPARATUS AND METHOD

This application claims the benefit of U.S. provisional application No. 60/319.251, filed May 16, 2002.

BACKGROUND OF INVENTION

Field of the Invention

The present invention relates to the field of advertising, and more specifically to the public display of unsolicited advertising and informational messages.

Outdoor billboards are used to display advertising to occupants of vehicles in motion on public roadways. Typically billboards are changed infrequently, on the order of monthly. Furthermore, due to the lack of selectivity, the content of such billboards are limited to subject matters that apply to a large group of the driving public. It is not cost effective to display on such billboards advertisements or information directed to a small segment of the population. It is also impossible to display different messages to different vehicles, limiting the return on investment for billboard operators.

What is needed is a system where directed advertising can be made efficiently to vehicles in motion. Directed advertising provides a more cost effective solution for advertisers and an increased income for billboard operators. Furthermore, if it were possible to display different messages to different vehicles, based on occupant profiles, maximum flexibility would be afforded to advertisers to market specific products to customized markets. The foregoing limitations and desired solutions equally apply to billboards and other displays viewed by individuals on foot or using other modes of transportation, such as bicycles, motorcycles, or boats.

SUMMARY OF INVENTION

An aspect of the present invention is to provide a method for delivering advertising or information messages specific to the occupants of a certain vehicle. Each vehicle is sensed, information is extracted from the sensed data and a message is selected to display. The information extracted from the sensed information can be the make, model, year, color, number of passengers, physical condition of the vehicle, the license plate number, information from the license plate frame and/or information from bumper stickers.

In one aspect of the present invention, a profile of the occupants of a sensed vehicle is formed and this occupant profile is used in the process of selecting a message to display. The present invention can operate in real-time to display different messages to each vehicle traveling at high speed on a multi-lane freeway. A further aspect of the present invention is to maintain information regarding which messages have been displayed to which vehicles and how often, for purposes of billing or statistical analysis.

Another aspect of the present invention is to provide an apparatus for sensing vehicles in motion, processing sensed data, selecting a message to display to the sensed vehicle and delivering that message to a display device. The processing apparatus preferably analyzes sensed data to extract information and includes a database that is used to assist in the forming of an occupant profile based on the extracted information.

DETAILED DESCRIPTION

The present invention relates to a system in which vehicle specific or person specific advertising or other informational messages are provided automatically. In one embodiment, vehicles may be in motion, possibly at high speed. The system senses characteristics of each vehicle, processes that information, and displays one or more messages to the occupant or occupants of the sensed vehicle. The display device can consist of one or more electronic outdoor billboards or electronic display devices, oriented so as to be viewable by the operator and/or passengers of each vehicle.

Figure 1:
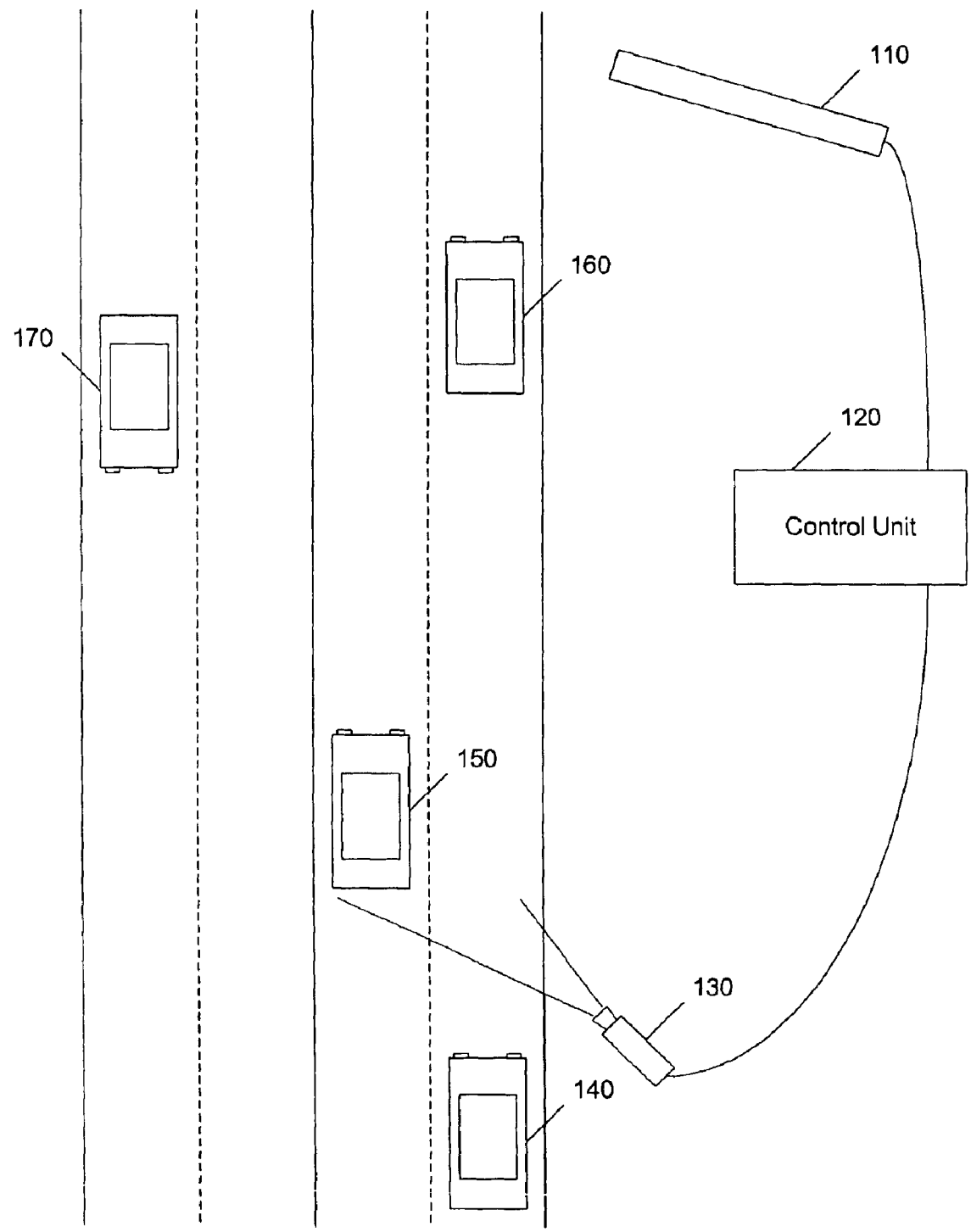
FIG. 1 illustrates a physical layout of an embodiment of the present invention.

It is intended that the sensing, processing and display of messages occur in real-time. If the vehicle is in motion, the time between when the sensing device sense the vehicle and when the vehicle comes into view of the display device determines the maximum processing time. For example, if a vehicle is traveling at 60 miles per hour and the vehicle is imaged 100 yards before the display is viewable, the processing must take less than approximately 3.4 seconds. The computational resources and complexity of the processing must be chosen appropriate to the time constraints given the physical layout of the overall system FIG. 1 illustrates one embodiment and shows the physical layout of the present invention. Camera 130 is coupled to control unit 120, which is coupled to display device 110. Vehicles 140, 150, 160 and 170 represent vehicles, such as private automobiles, in motion on a road or highway. Camera 130 is a sensing device that is positioned to image vehicles as they pass. In FIG. 1, the rear of vehicle 150 is positioned to be sensed by camera 130. In alternative embodiments, the sensing mechanism can consist of multiple cameras at different positions or focused on different lanes. It may be desirable to observe both the front and rear of each vehicle, or just one or the other. A digital camera with a high speed electronic shutter feature attached to a digital image capture system can be used to retrieve the images from each vehicle. Camera 130 may be an infrared camera to reliably sense information at night. In alternative embodiments, other vehicles, such as boats or motorcycles may be sensed rather than automobiles. In still other embodiments, individual people, such as those walking on a public sidewalk, may be the subjects of the sensing device.

It is also possible to sense vehicles other than through optical means. For example, radio frequency transmitters could be used. This would require vehicles to be equipped with specific equipment. In certain circumstances it may be desirable to display messages only to specifically equipped vehicles rather than to the public at large. Audio detection of persons or vehicles would also be possible and sophisticated techniques could be used to extract information from detected sounds.

Display device 110 is provided such that the driver and/or other occupants of each vehicle can observe it. Display device 110 can be an electronic billboard capable of displaying graphic images and text. The display can be oriented such that it is observable by a single vehicle at a time, or by several vehicles. In alternative embodiments, there could be a display device for each lane, rather than a single device viewable by all lanes.

Control unit 120 is responsible for processing the sensed data and driving the display device in real time. The processing may consist of several steps as described below. If the vehicle is in motion, the time between when the car is imaged and when it is positioned such that the display device is observable constitutes the allowable processing time. The time during which the driver and/or other occupant of the vehicle can observe the display device is the time during which the message must be displayed. Multiple messages can be displayed during the time in which the display device is viewable. In the case that multiple vehicles can view the display at the same time, messages can be displayed for each vehicle, or a different selection can be made based on a combined viewing audience.

Figure 2:
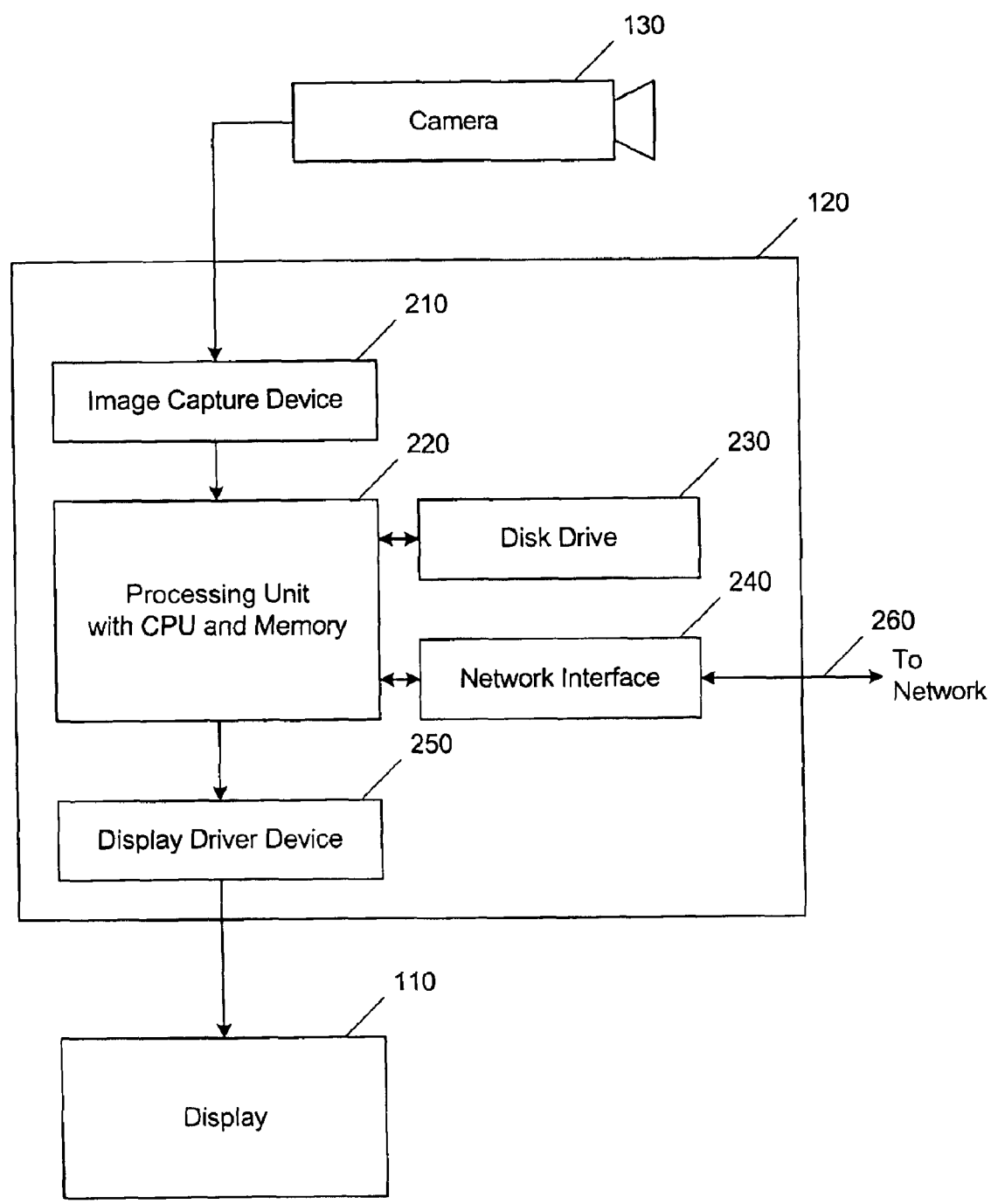
FIG. 2 illustrates an embodiment of the control unit.

Referring now to FIG. 2, detail of one embodiment of control unit 120 is illustrated. Camera 130 is coupled to image capture device 210, which is coupled to processing unit 220. Processing unit 220 is coupled to disk drive 230, network interface 240 and to display driver 250. Display driver 250 is coupled to display device 110. Network interface 240 is coupled through path 260 to a network.

Image capture device 210 receives sensed camera data and stores it for processing. Processing unit 220 processes the sensed camera data, utilizing local information stored in memory, local information stored on disk drive 230, or remote information received via network interface 240. After processing messages are delivered to display device 110 through display drive 250.

The purpose of control unit 120 is to process the image data captured by the sensing system and to select, based on the information extracted, one or more messages to be displayed to the person or vehicle. The processing system can be generally split into two mechanisms: information extraction and message selection.

Figure 3:
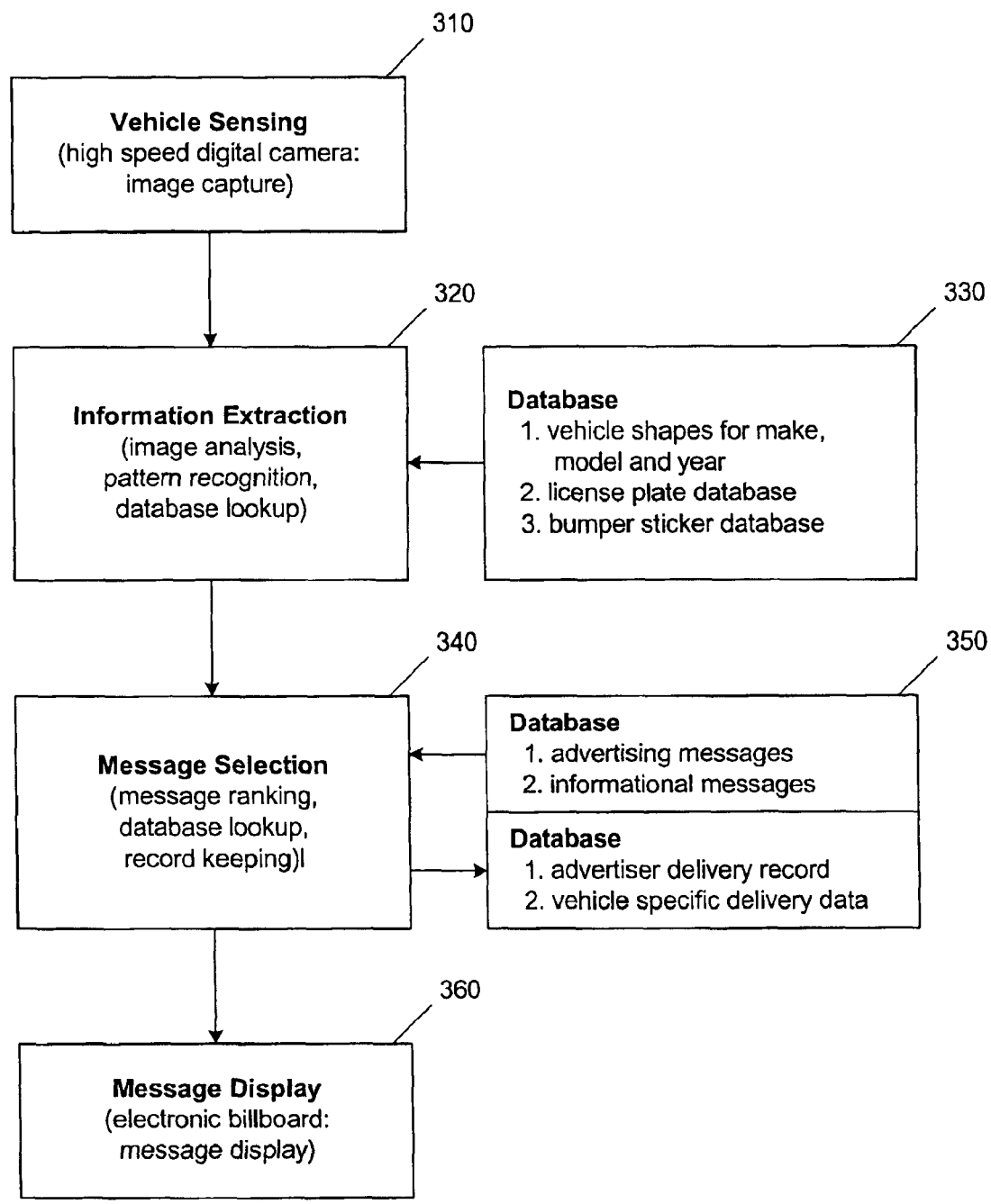
FIG. 3 illustrates a flow chart for an embodiment of the processing performed.

FIG. 3 illustrates steps involved in the processing of one embodiment of the present invention. The first step 310 is the capture of sensed image data. The second step 320 is the extraction of information from the sensed vehicle data. This involves image analysis and pattern recognition and preferably a database lookup. Pattern recognition algorithms are used to determine the outline of the vehicle and locate other information for which further processing is required.

The information extracted from each vehicle can consist of any subset of the following: make, model, year of manufacture, color, condition, license plate number, information from license plate frame, parking stickers, other bumper stickers, number of occupants, and other similar information.

After pattern recognition, a query is made of database 330 that can contain any of the following: outlines for vehicle makes, models and years; vehicle license plate data; and other information relating to bumper stickers (such as patterns for city parking stickers). The result of this query will be information relating to which message or messages should be displayed. This could consist of the zip code, projected age, projected income level, and projected sex of driver, or any other similar information. In alternative embodiments, database 330 may include face recognition data to permit individual people to be recognized. Database 330 may be stored locally within control unit 120, or may be queried remotely through network path 260.

The goal of the information extraction step 320 is to determine relevant information regarding the occupants of the vehicle. This relevant information would differ depending on the nature of the messages being delivered. In the case of advertising messages, the sex, age, residence location and income level may be most significant. In other cases merely the number of occupants may be used. The processing of the imaged information to determine the occupant information could take a variety of forms. In one scenario, a database of car license plate numbers would be used to simply look up the required information. The captured image of a license plate would be analyzed to determine the number and state of issuance and this information would be used to query the database.

In another scenarios, the make, model and year of the vehicle would be used to form a probable profile of the occupants. In this case the captured image or images would be analyzed, using pattern recognition techniques, to outline the vehicle shape and other defining characteristics. This information would be used to match against a database of makes, models and years of vehicles. Once the type of vehicle is determined, a profile of the occupants would be created to generate the relevant information. Other information such as parking stickers (indicating location of residence), license plate frame information (indicating where the vehicle was purchased or serviced), or political bumper stickers (indicating the political leaning of the owner) may be used to enhance this profile and come up with more accurate occupant information. The time of day and number of occupants may also be used for this purpose.

The next step in the processing is message selection 340. Message selection determines which message or messages should be displayed to the person or vehicle. This can be done by scoring the various messages based on the characteristics determined in the previous step and selecting the top-ranking message. In the case of advertising messages, a given advertiser may which to display advertisements only to people of a specific income level and age, for example. The processing may additionally involve the recording of which messages were delivered such that the advertiser can be billed accordingly.

This message selection step would differ depending on the nature of the messages being delivered. In the case of advertising messages, the advertisers may have determined for each message a target audience. Also there may be multiple advertisements that overlap in their potential relevance to the sensed vehicle. One mechanism would be to rank all advertisements based on their relevance and show the vehicle the most relevant message. This mechanism could also include information about how often a particular message has been shown (in order to distribute message delivery across as many advertisements as possible, for example). Another mechanism would be to randomly select a message among the group that is considered relevant to the sensed vehicle.

Database 350 is used to store messages and to update delivery information. Database 350 may be store locally in control unit 120 or may be queried and updated over network path 260. Message display step 360 is the final step and involves sending the selected message or messages at the appropriate times to display device 110.

An enhancement to the message selection mechanism would be to maintain for each vehicle data on whether a particular message has already been shown. This would be used control the variety and sequence of messages shown to a particular vehicle. For example, a certain vehicle that passes the display every weekday for commuting could be given a different message easy day. This feature would be accomplished by updating a database containing vehicle identifying information and advertisement delivery data every time a message is shown. With a large enough database, even a busy freeway in which several hundred thousand vehicles pass every day could be accommodated.

This message delivery database may need to contain more specific information than that used to come up with the occupant profile. For example, it may not be practical or legal to use the license plate number for information extraction, but it may be convenient to use this information in the message delivery database. It may also be necessary to record message delivery information in order to provide billing information to the advertisers, if a per-delivery charging model is used.

The foregoing description of preferred embodiments of the present invention has been provided for the purpose of illustration and description. It is not exhaustive or limiting of the invention. Many modifications and variations will be apparent to practitioners skilled in the art.

What is claimed is:

1. A method for providing unsolicited advertising or informational messages to one or more occupants of anonymous vehicles comprising the steps of:
   (a) sensing a vehicle;
   (b1) extracting information from said sensed vehicle;
   (b2) forming a predicted occupant profile based on said extracted information;
   (c) selecting a message to display based on said predicted occupant profile;
   (d) displaying said selected message.

2. The method of claim 1 wherein said extracted information comprises any subset of the following: make, model, year, color, number of passengers, physical condition of vehicle, license plate number, license plate frame information and bumper sticker information.

3. The method of claim 1 wherein said method operates in real-time to display messages to vehicles in motion.

4. The method of claim 1 wherein said occupant profile includes any subset of the following: sex, age, location of residence, and income level.

5. The method of claim 1 wherein said predicted occupant profile is formed utilizing a statistical matching of said extracted information with occupant characteristics.

6. A method of providing unsolicited advertising or informational messages to one or more occupants of anonymous vehicles in motion comprising the steps of:
   (a) sensing a vehicle and storing sensed image data;
   (b) analyzing said stored image data;
   (c) forming a predicted occupant profile using the results of said step
   (e) selecting a message based on said predicted occupant profile;
   (f) displaying said selected message.

7. The method of claim 6 further comprising the step of updating a database with message delivery information.

8. The method of claim 6 further comprising the step of repeating said steps (a) through (g) for a plurality of vehicles.

9. The method of claim 6 wherein said step (e) comprises ranking a plurality of messages and selecting the top ranking message based on a selection criteria.

10. The method of claim 6 wherein said predicted occupant profile is formed utilizing a statistical matching of the results of said step (b) with occupant characteristics.

11. An apparatus for providing unsolicited advertising or informational messages to anonymous vehicles comprising:
    (a) a vehicle sensing device;
    (b) a display device;
    (c) a processing system for forming a predicted occupant profile based on information received from said vehicle sensing device, selecting a message to display based on said occupant profile and activating said display to display said selected message.

12. The apparatus of claim 11 wherein said processing system further comprises processing capabilities for analyzing sensed data and extracting information from said sensed data.

13. The apparatus of claim 11 further comprising a database storing message delivery information.

* * * * *